E. ALLT.
Compression Cocks.

No. 140,337.  Patented July 1, 1873.

UNITED STATES PATENT OFFICE.

EDMUND ALLT, OF NEW YORK, N. Y.

IMPROVEMENT IN COMPRESSION-COCKS.

Specification forming part of Letters Patent No. 140,337, dated July 1, 1873; application filed September 2, 1872.

*To all whom it may concern:*

Be it known that I, EDMUND ALLT, of the city, county, and State of New York, have invented Improvements in Compression-Cocks, of which the following is a specification:

This invention consists in the combination, with the shell of the cock and cap of the same, of an interposed soft-metal ring or washer and a contained packing of cork or other suitable material with which the aforesaid cap, when in place, is in contact, whereby the joint of the cap and shell is packed, and so also is the spindle of the valve.

Figure 1:
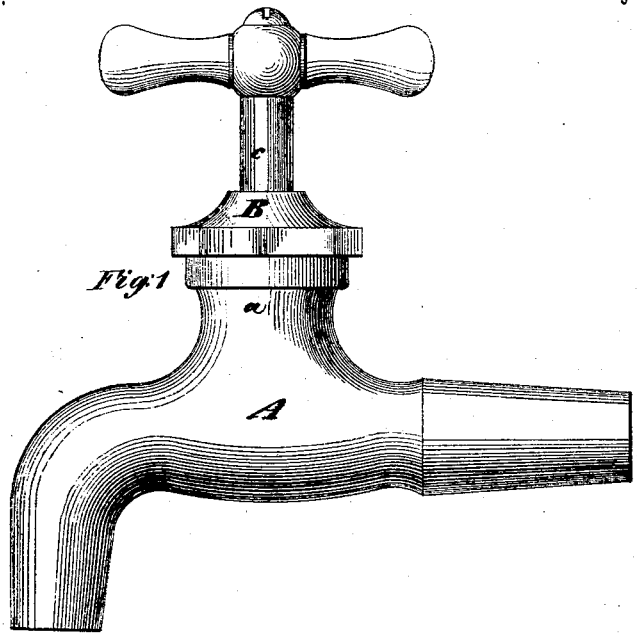
Figure 2:
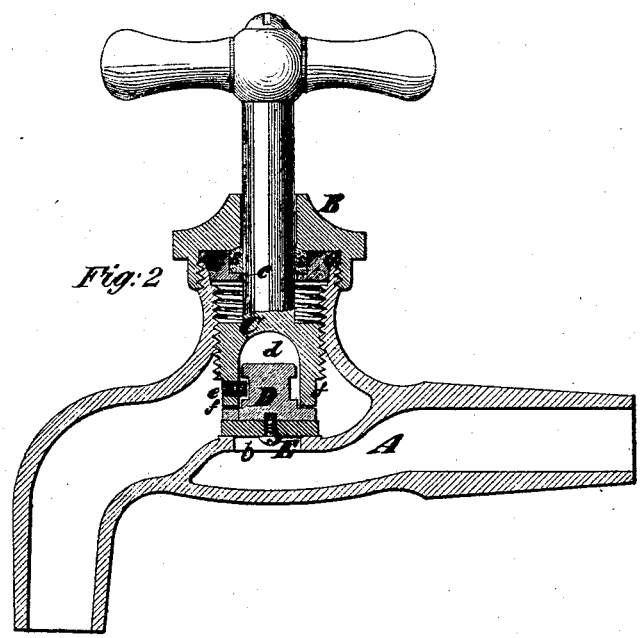

In the accompanying drawing, Figure 1 is a view of the cock made according to my invention, and Fig. 2 is a central longitudinal section of the same.

Similar letters of reference indicate corresponding parts in both figures.

A is the shell of the cock. On its upper side, about the middle of its length, it is provided with a ring-shaped or annular portion, $a$, which is screw-threaded both externally and internally—externally to receive the cap B, and internally for the reception of the screw C by which the valve of the cock is operated. In the shell under the annular portion or socket $a$ is the valve-seat $b$, which is formed in the usual way, so that the water-passage in the cock is intercepted by it. The screw C is formed on a shank, $c$, which passes up through the cap B, and is furnished at the end with a handle, by which the valve of the cock is manipulated. There is a cavity, $d$, in the lower side of the said screw, and into this there projects a swiveling-stud D, which is secured in place so as to be free to turn by means of a screw or pin, $e$, passing through a shell, $f$, formed below the screw $c$, and projecting into a circumferential groove in said stud. On the under side of the shell is a flange of the same size as the shell $f$ formed below the screw C. To the under side of the stud is secured by a screw or other means a washer, E, of leather or other soft material, which comes in contact with the valve-seat when the cock is closed. G is a ring or washer of soft metal, which surrounds the valve-stem or shank $c$, and has formed on the upper edge of its exterior a flange, $g$. The body of the ring or washer fits in a recess formed in the interior of the socket $a$, above the screw-thread therein, and its flange fits between the top of said socket and the cap. In the upper part of this washer there is a ring, $s$, of cork, leather, or other like substance fitting snugly around the valve-shank $c$. The top of this ring projects above the top of the washer G, and the cap B bears on it. The flange of the soft-metal washer packs the joint between the cap and the shell of the cork, and the cork, pressed around the valve-shank by the cap B, packs said shank very effectively.

By reason of the cavity in the screw of the valve considerable metal is saved in the manufacture of the cock, and by attaching the valve-washer to the swiveling-stud its wear on the valve-seat is greatly reduced.

I claim—

The combination of the shell A of the cock and its cap B with the soft-metal washer G and packing $s$ contained in said washer, substantially as and for the purpose set forth.

EDMUND ALLT.

Witnesses:
   MICHAEL RYAN,
   FRED. HAYNES.